June 27, 1939.  F. D. FOWLER  2,164,058
METHOD AND APPARATUS FOR MAKING RUBBER STRIPS
Filed March 25, 1936  2 Sheets-Sheet 1
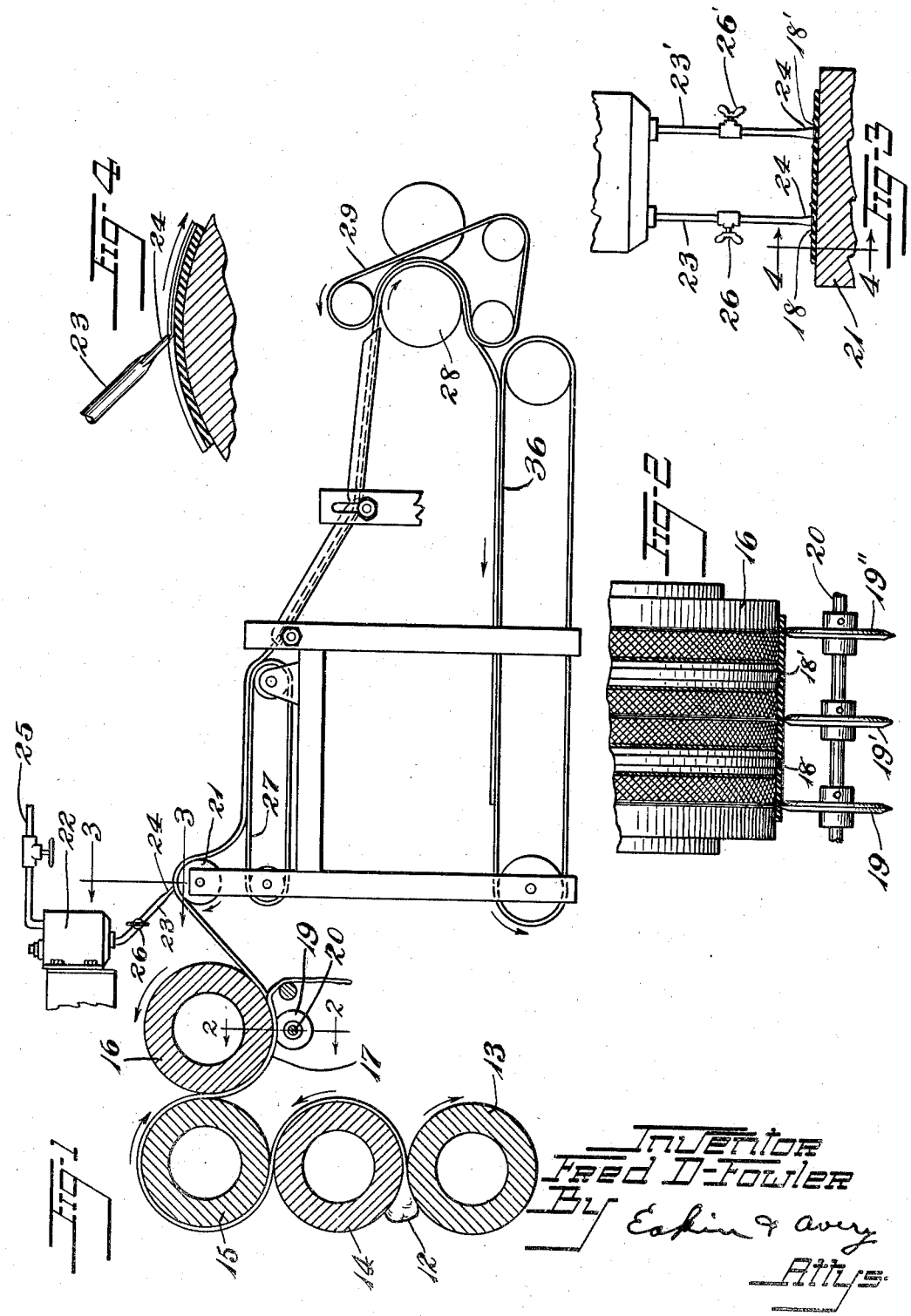
Inventor
Fred D. Fowler
By Eakin & Avery
Attys.

June 27, 1939.　　　F. D. FOWLER　　　2,164,058
METHOD AND APPARATUS FOR MAKING RUBBER STRIPS
Filed March 25, 1936　　　2 Sheets-Sheet 2
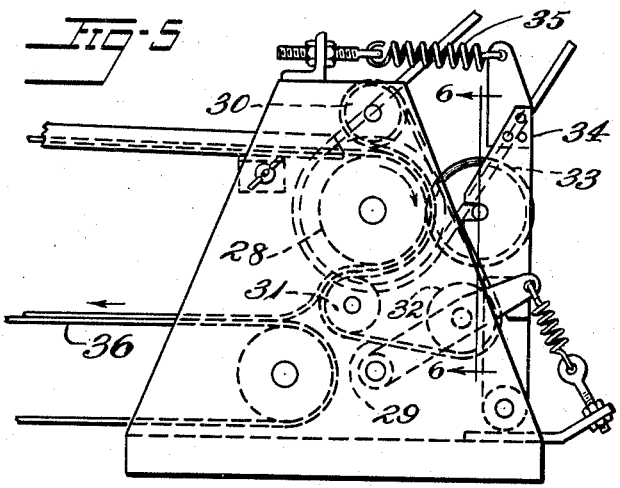
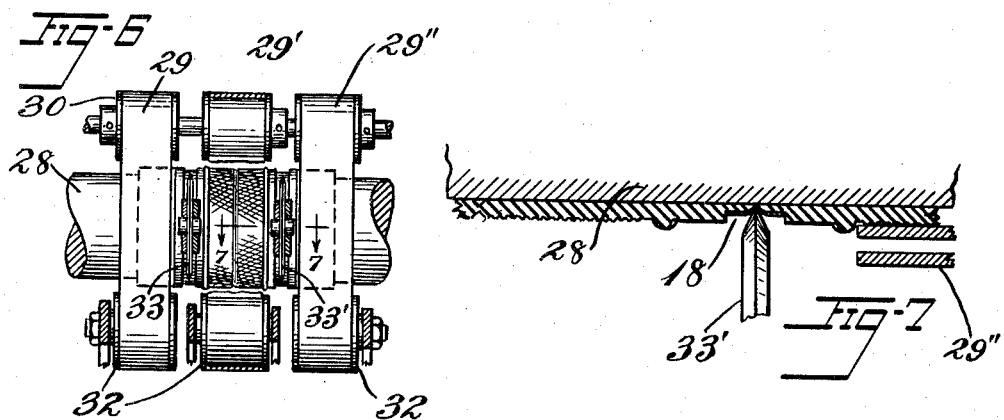
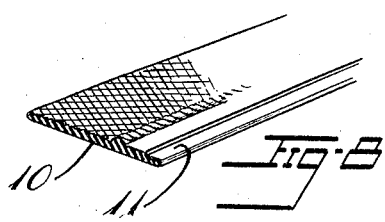
Inventor
Fred D. Fowler
By Eakin & Avery
Attys.

Patented June 27, 1939

2,164,058

UNITED STATES PATENT OFFICE 2,164,058

METHOD AND APPARATUS FOR MAKING RUBBER STRIPS

Fred D. Fowler, Newton, Mass., assignor to Hood Rubber Company, Inc., Watertown, Mass., a corporation of Delaware Application March 25, 1936, Serial No. 70,776

8 Claims. (Cl. 18—11)

This invention relates to methods and apparatus for making rubber strips comprising different colors such as are used in trimming shoes and other rubber articles.

In the manufacture of rubber shoes and other rubber articles it is often desired to trim the article with rubber strips having a multi-colored ornamental appearance. Such strips are used in the manufacture of rubber footwear as a foxing strip applied to the shoe above the margin of the sole.

The principal objects of the present invention are to provide economy, efficiency, accuracy, and simplicity in the manufacture of such strips and to provide advantageous mechanism therefor.

Other objects will appear from the following description and the accompanying drawings.

Of the drawings:

Fig. 1 is a side elevation, partly in section, showing the preferred form of apparatus for carrying out the invention.

Fig. 2 is a sectional detail view taken on line 2—2 of Fig. 1.

Fig. 3 is a sectional detail view taken on line 3—3 of Fig. 1.

Fig. 4 is a sectional detail view taken on line 4—4 of Fig. 3.

Fig. 5 is a non-divided side elevation of the trimming unit shown at the right of Fig. 1.

Fig. 6 is a sectional view taken on line 6—6 of Fig. 5.

Fig. 7 is a sectional view taken on line 7—7 of Fig. 6.

Fig. 8 is a perspective view of a portion of a single strip produced by practicing the invention.

Referring to the drawings, the strip shown in Fig. 8 comprises a narrow strip of rubber 10 of one color having an embossed design on its face and having applied along one of its margins of the embossed face a narrower strip preferably of rubber 11 of a different color which extends over the edge face adjacent thereto.

In order to accurately and efficiently produce such a strip, a mass 12 of plastic unvulcanized rubber composition suitable for forming the base strip 10 is formed between the rolls 13, 14, 15 and 16 of an ordinary four roll calender to provide a sheet 17 of rubber material having sufficient width to provide a multiplicity of the desired strips. Roll 16 is an engraved roll adapted to provide the embossed surface desired. The engraving thereon is so arranged as to form alternately reversed strip impressions whereby the margins of strips to be coated with rubber of a different color are located adjacent each other to provide for simultaneous coating and subsequent division. The portions of the sheet to be coated are depressed as at 18, 18', to form longitudinal channels in the sheet.

As the sheet 17 contacts with the engraved roll 16 it is almost completely severed into pairs of strips with channels 18, 18' therebetween, and excess marginal portions of the sheet are trimmed therefrom, by a series of circular cutters 19, 19, 19', 19'' mounted on a shaft 20.

As the sheet leaves the calender it is is carried over a driven roll 21 above which is a tank 22 having outlet tubes 23, 23'. Each outlet tube is flattened at its lower end, as at 24 to provide a rectangular orifice and is aligned with one of the channels 18 in the strip. A quantity of liquid-dispersed coating material such as a thick rubber dispersion is placed in the tank 22. Pressure is applied to the tank above the liquid by means of a pipe 25 connected to a source of air pressure, not shown. Valves 26, 26' control the flow of fluid. The arrangement is such that as the strip passes over the roll 21, a coating of rubber dispersion is deposited in each groove, the size of the orifice and the width of the channel in the strip determining the extent of the coating.

After the sheet receives the coating it proceeds over a driven drying conveyor 27 to the trimming device. The trimming device comprises a plain faced driven roller 28 which engages a bite of a plurality of clamping belts 29, 29', 29''. These belts are trained about guide pulleys 30 and 31 and tension pulleys 32. A plurality of circular cutters 33, 33' are rotatably mounted on a swing frame 34 and are urged against the roll 28 by a spring 35. Each circular cutter is aligned with the center of a channel 18 of the sheet and has a V-shaped periphery. The arrangement is such that the sheet is severed longitudinally at the center of each channel. The V-shaped periphery of each cutter not only severs the sheet but forces the deposited rubber over the incised margins of the strips. The cutters while shown as adapted to cut the sheet along straight lines may have their cutting edges arranged to cut a pinked or other ornamental cut.

As the strips are delivered to a conveyor belt 36 from the cutting device, they may be separated into individual strips along the lines of cutting.

I claim:

1. Apparatus for making strips of rubber, said apparatus comprising means for continuously forming an embossed sheet of rubber having a longitudinal channel, means for progressively depositing in said channel a dispersed rubber composition, and means for progressively dividing the sheet and the deposited material as a unit longitudinally of the channel by cutting through the deposited material and sheet while the deposited material is in a flowable condition to force the same over and upon the severed edge of the sheet as it is divided.

2. Apparatus for making strips of rubber, said apparatus comprising means for continuously forming a sheet of rubber, means for progressively depositing a band of dispersed rubber thereon, and means for progressively dividing the sheet and the deposited material as a unit longitudinally along the band by cutting through the deposited material and sheet while the deposited material is in a flowable condition to force the same over and upon the severed edge of the sheet as it is divided.

3. The method of making a composite material which comprises depositing upon a portion only of the face of sheet rubber material a band of flowable coating material of contrasting appearance, and severing the material by cutting through the band and sheet longitudinally of the band to divide the same while simultaneously forcing the coating material over and upon the severed edge of the sheet to provide a composite, coated margin.

4. The method of making a composite material which comprises forming sheet rubber composition with a channel in its face, depositing liquid dispersed coating material in said channel, and severing the material longitudinally of the channel by cutting through the deposit and sheet to divide the same while simultaneously forcing the deposited material in a flowable condition over and upon the severed edge of the sheet.

5. The method of making ornamental strips of rubber material which comprises applying a band of contrasting material upon a face of sheet rubber composition, and severing the same longitudinally along the band by cutting through the band and sheet to provide a pair of composite strips each having a margin of contrasting color while simultaneously forcing the contrasting material over and upon the cut edges of the sheet rubber composition.

6. The method of making ornamental strips of rubber material which comprises progressively applying a band of contrasting material upon a face of sheet rubber composition in long length, and progressively severing the same longitudinally along the band by cutting through the band and sheet to provide a pair of composite strips each having a margin of contrasting color while simultaneously forcing the contrasting material over and upon the cut edges of the sheet rubber composition.

7. The method of making ornamental strips of rubber material which comprises forming sheet rubber composition with a channel in its face, applying a band of liquid dispersed coating material in said channel to provide a uniform contrasting band upon the face of the sheet rubber composition, and severing the same longitudinally along the band by cutting through the band and sheet to provide a pair of composite strips each having a margin of contrasting color while simultaneously forcing the contrasting material over and upon the cut edges of the sheet rubber composition.

8. The method of making ornamental sheet material with a composite margin, which method comprises forming sheet rubber composition with a channel in its surface, depositing in said channel an ornamenting material of contrasting appearance, and severing the ornamenting and sheet material longitudinally along the channel to provide the material with a trimmed composite margin while simultaneously forcing the contrasting material over and upon the cut edges of the sheet rubber composition.

FRED D. FOWLER.